(12) United States Patent
Kong (10) Patent No.: US 11,309,751 B2
(45) Date of Patent: Apr. 19, 2022

(54) STATOR CORE AND MOTOR USING THE SAME

(71) Applicant: LG INNOTEK CO., LTD., Seoul (KR)

(72) Inventor: Bong Bae Kong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/229,434

(22) Filed: Apr. 13, 2021

(65) Prior Publication Data

US 2021/0234414 A1     Jul. 29, 2021

Related U.S. Application Data (63) Continuation of application No. 16/813,014, filed on Mar. 9, 2020, now Pat. No. 11,005,314, which is a continuation of application No. 15/541,673, filed as application No. PCT/KR2015/014092 on Dec. 22, 2015, now Pat. No. 10,622,850.

(30) Foreign Application Priority Data

Jan. 6, 2015    (KR) .................. 10-2015-0001326

(51) Int. Cl.
| | |
|---|---|
| *H02K 1/16* | (2006.01) |
| *H02K 1/14* | (2006.01) |
| *H02K 3/34* | (2006.01) |
| *H02K 1/272* | (2022.01) |

(52) U.S. Cl.
CPC .............. *H02K 1/16* (2013.01); *H02K 1/146* (2013.01); *H02K 1/272* (2013.01); *H02K 3/345* (2013.01)

(58) Field of Classification Search
CPC ......... H02K 1/146; H02K 1/272; H02K 1/345
See application file for complete search history.

(56) References Cited

U.S. PATENT DOCUMENTS

| | | |
|---|---|---|
| 3,745,394 A | 7/1973 | Mason |
| 4,922,165 A | 5/1990 | Crawford et al. |
| 5,306,976 A | 4/1994 | Beckman |

(Continued)

FOREIGN PATENT DOCUMENTS

| | | |
|---|---|---|
| CN | 2583870 Y | 10/2003 |
| CN | 104079086 A | 10/2014 |

(Continued)

OTHER PUBLICATIONS

International Search Report in International Application No. PCT/KR2015/014092, filed Dec. 22, 2015.

(Continued)

*Primary Examiner* — Robert W Horn
(74) *Attorney, Agent, or Firm* — Saliwanchik, Lloyd & Eisenschenk (57) ABSTRACT

The present invention relates to a stator core for improving the fixing properties of a magnet wire, and a motor in which the same is applied. Provided is a stator core which comprises a protrusion pattern part for fixing the distal end portion of a magnet wire, and thus eliminates a process of fixing the wire using a separate member during a wiring process, thereby improving processability and inhibiting an insulating film of the magnet wire from being damaged by an external force such as vibration.

19 Claims, 9 Drawing Sheets

(56) References Cited

U.S. PATENT DOCUMENTS

| | | |
|---|---|---|
| 6,414,413 B1 | 7/2002 | Arai et al. |
| 6,580,193 B2 | 6/2003 | Yoshikawa et al. |
| 8,076,819 B2 | 12/2011 | Taema |
| 8,546,992 B2 | 10/2013 | Hsu et al. |
| 9,154,010 B2 | 10/2015 | Yokogawa |
| 9,455,606 B2 | 9/2016 | Ewert et al. |
| 9,467,018 B2 | 10/2016 | Kitta et al. |
| 9,490,675 B2 | 11/2016 | Kim et al. |
| 9,601,959 B2 | 3/2017 | Shirai et al. |
| 9,601,960 B2 | 3/2017 | Hino et al. |
| 9,705,373 B2 | 7/2017 | Azusawa |
| 9,722,466 B2 * | 8/2017 | Tsuiki .................... H02K 3/345 |
| 10,103,594 B2 | 10/2018 | Takimoto |
| 10,622,850 B2 * | 4/2020 | Kong ..................... H02K 1/272 |
| 2002/0130580 A1 | 9/2002 | Arai et al. |
| 2010/0141079 A1 | 6/2010 | Chu et al. |
| 2011/0109189 A1 | 5/2011 | Taema |
| 2012/0080976 A1 | 4/2012 | Oka et al. |
| 2013/0169085 A1 | 7/2013 | Taema |
| 2014/0015349 A1 | 1/2014 | Chamberlin et al. |
| 2014/0035428 A1 | 2/2014 | Yuya et al. |
| 2014/0375161 A1 | 12/2014 | Haga et al. |
| 2015/0028715 A1 | 1/2015 | Tsuiki et al. |
| 2016/0111933 A1 | 4/2016 | Takimoto |
| 2017/0133901 A1 | 5/2017 | Burch et al. |
| 2017/0222513 A1 | 8/2017 | Lee et al. |
| 2018/0006511 A1 | 1/2018 | Kong |
| 2018/0061559 A1 | 3/2018 | Lee et al. |
| 2018/0358858 A1 | 12/2018 | Tsuiki et al. |
| 2019/0006901 A1 | 1/2019 | Henry et al. |
| 2019/0249653 A1 | 8/2019 | Suzuki |
| 2019/0288575 A1 | 9/2019 | Tussing et al. |
| 2019/0341824 A1 | 11/2019 | Lee |
| 2020/0227987 A1 | 7/2020 | Yamaguchi et al. |

FOREIGN PATENT DOCUMENTS

| | | |
|---|---|---|
| JP | 2001-286085 A | 10/2001 |
| JP | 2006-115565 A | 4/2006 |
| JP | 2007-236057 A | 9/2007 |
| JP | 2009-177985 A | 8/2009 |
| JP | 2014-207755 A | 10/2014 |
| KR | 10-2012-0066917 A | 6/2012 |
| WO | WO-2014-060950 A2 | 4/2014 |

OTHER PUBLICATIONS

Office Action dated Dec. 3, 2018 in Chinese Application No. 201580072568.7.

Office Action dated Aug. 23, 2019 in U.S. Appl. No. 15/541,673.

Notice of Allowance dated Dec. 20, 2019 in U.S. Appl. No. 15/541,673.

Office Action dated Dec. 22, 2020 in Korean Application No. 10-2015-0001326.

Notice of Allowance dated Jan. 14, 2021 in U.S. Appl. No. 16/813,014.

Corrected Notice of Allowance dated Mar. 16, 2021 in U.S. Appl. No. 16/813,014.

Office Action dated Aug. 20, 2021 in Korean Application No. 10-2021-0098855.

Office Action dated Oct. 28, 2021 in Chinese Application No. 202010139614.3.

* cited by examiner

STATOR CORE AND MOTOR USING THE SAME

CROSS-REFERENCE TO RELATED APPLICATIONS

This application is a continuation of U.S. application Ser. No. 16/813,014, filed Mar. 9, 2020; which is a continuation of U.S. application Ser. No. 15/541,673, filed Jul. 5, 2017, now U.S. Pat. No. 10,622,850, issued Apr. 14, 2020; which is the U.S. national stage application of International Patent Application No. PCT/KR2015/014092, filed Dec. 22, 2015, which claims priority to Korean Application No. 10-2015-0001326, filed Jan. 6, 2015, the disclosures of each of which are incorporated herein by reference in their entirety

TECHNICAL FIELD

The teachings in accordance with exemplary and non-limiting embodiments of this disclosure relate generally to a stator core improved in fixability of magnet wire and a motor using the same.

BACKGROUND ART

In general, a motor is mainly composed of a stator and a rotor, and the stator is wound with a coil, and the rotor is coupled with a magnet to cause rotating due to mutual electromagnetic action with the magnet. The stator is formed with a unit core and a coil, and recently, a plurality of divided coils is connected in a ring shape to be used as a stator. An insulator (hereinafter referred to simply as "insulator") is inserted to insulation between the core and the coil.

Particularly, the insulator has a structure where a coil is wound, and when a wire, generally called a magnet wire, is wound on the insulator, an outermost coil is not fixed to generate damage or cut problem on an insulated film of the magnet wire due to trembling phenomenon caused by outside vibration.

DETAILED DESCRIPTION OF THE INVENTION

Technical Subject

The teachings in accordance with exemplary and non-limiting embodiments of this disclosure are to provide solve the abovementioned problem by providing a protruding pattern part fixing a distal end of a magnet wire to remove a wire-fixing operation using a separate member during wiring operation, whereby a processibility can be improved and a stator core inhibiting damage to insulated film of the magnet wire caused by outside force such as vibration can be provided.

Technical Solution

In one general aspect of the present invention, there is provided a stator coil, the stator coil comprising:

a unit stator core provided with a tooth protruded from a head part;

an insulation member coupled to the unit stator core and wound with a coil; and a coil-fixing protrusion pattern part provided on a surface of the insulation member.

Preferably, but not necessarily, the insulation member may include a body part wound with a coil and provided with a winding guide groove, and an edge part extended from the body part and arranged with the protrusion pattern part.

Preferably, but not necessarily, the protrusion pattern part may be realized by an embossed 3D (dimensional) structure on a surface of the edge part.

Preferably, but not necessarily, a first bank angle may be provided on a surface of the 3D structure from an outermost marginal part of the protrusion pattern part to a body part side.

Preferably, but not necessarily, the protrusion pattern part may be arranged by being extended along a lengthwise direction of the insulation member.

Preferably, but not necessarily, the stator core may be further provided at an opposite surface realized with the first bank angle with a fixation groove pattern that is concaved to a center of the 3D structure.

Preferably, but not necessarily, the bank angle may be an acute angle formed by an extension line from surface of the edge part and an extension line from the 3D structure.

Preferably, but not necessarily, the protrusion pattern part may include a discrete part which is fixed at one end to the surface of the edge part, and which is discrete at the other end from the surface of the edge part.

Preferably, but not necessarily, a discrete width of the discrete part may be uniform.

Preferably, but not necessarily, the protrusion pattern part may be fixed at one end near to the body part to the surface of the edge part, and may be formed at the other end with a bank angle toward the body part.

Preferably, but not necessarily, the protrusion pattern part may be fixed at the other end distanced from the body part to the surface of the edge part, and the other end may form a bank angle toward the body part.

Preferably, but not necessarily, a second bank angle may be formed at a surface of an opposite 3D structure formed with the bank angle.

Preferably, but not necessarily, the second bank angle may have an angle greater than that of the bank angle.

In another general aspect of the present disclosure, there is provided a motor, the motor comprising:

a motor housing;

a stator coil mounted at the motor housing and including a plurality of unit stator coils each having a tooth protruded from a head part, an insulator and a coil;

a rotor rotatably mounted at a center of the stator, and including a through hole formed at a center and a magnet module; wherein the stator core includes a unit stator coil provided with a tooth protruded from the head part, and an insulation member coupled to the unit stator coil and wound with a coil, and wherein a surface of the insulation member includes at least one coil fixation protrusion pattern part.

Advantageous Effects of the Invention

The advantageous effect according to exemplary embodiment of the present disclosure is that a protruding pattern part fixing a distal end of a magnet wire is provided to remove a wire-fixing operation using a separate member during wiring operation, whereby a processibility can be improved, and damage to insulated film of the magnet wire caused by outside force such as vibration can be inhibited.

Another advantageous effect is that prevention of short-circuit caused by friction between winding portions of a magnet wire from outside vibration allows short-circuit removal operation realized by using a separate member, and separate after treatment-process for inhibiting damage to insulated film of wire becomes unnecessary to thereby improve the processibility.

BEST MODE

Reference will now be made in detail to embodiments, examples of which are illustrated in the accompanying drawings. Like reference numerals designate like elements throughout the specification, and any overlapping explanations that duplicate one another will be omitted. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section.

Figure 1:
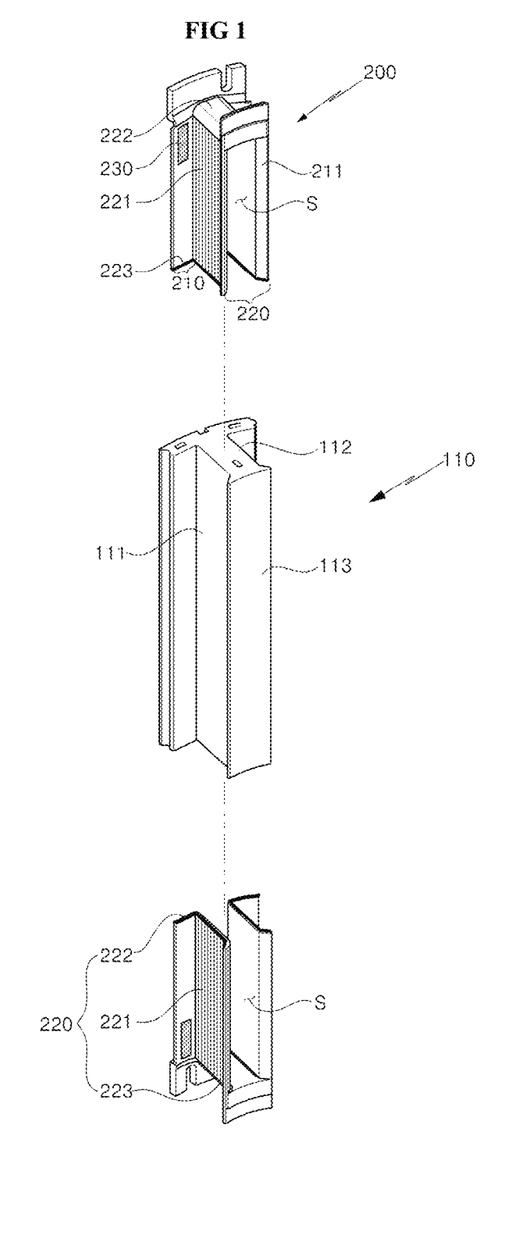
FIG. 1 is a separable perspective view exemplifying a coupled state between structure of unit stator core and insulation member in stator core according to an exemplary embodiment of the present disclosure.
Figure 2:
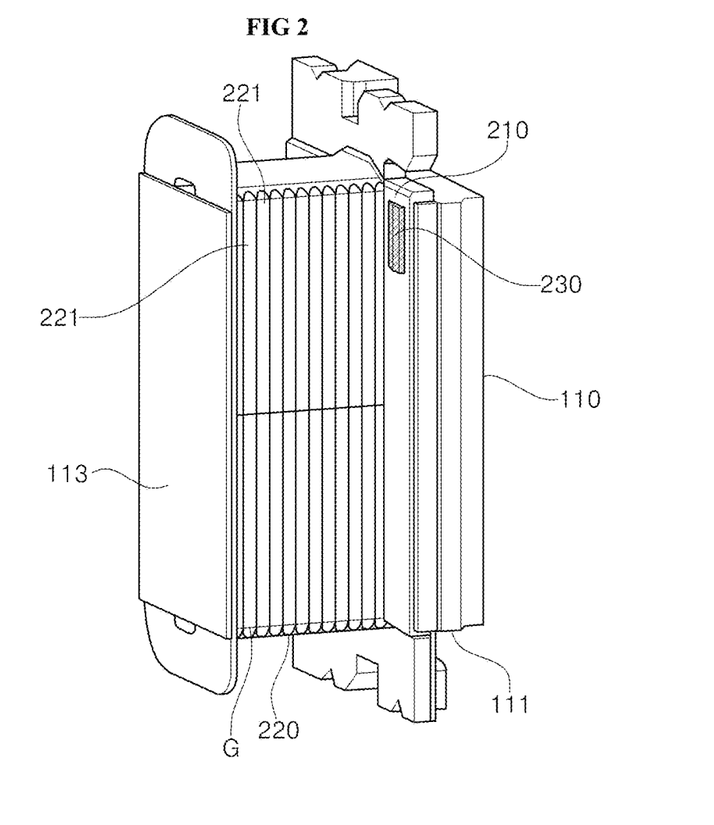
FIG. 2 is a schematic coupled perspective view of FIG. 1.

FIG. 1 is a separable perspective view exemplifying a coupled state between structure of unit stator core and insulation member in stator core according to an exemplary embodiment of the present disclosure, and FIG. 2 is a schematic coupled perspective view of FIG. 1.

Referring to FIGS. 1 and 2, a stator core according to an exemplary embodiment of the present disclosure may include a unit stator core (110) provided with a tooth (112) protruded from a head part, an insulation member (200) coupled to the unit stator core (110) and wound with a coil, and at least one coil-fixing protrusion pattern part (230) provided on a surface of the insulation member (200).

When the protrusion pattern part (230) is wound with a coil later, an outermost part is inhibited from being deviated to outside after the coil is wound, and an operation of temporarily fixing a coil using a separate member (tape and the like) or an operation of removing can be eliminated to improve the processibility, whereby an entire coil can be stably fixed to thereby inhibit a short-circuit caused by friction between coils.

Although drawings have exemplified a structure where the insulation member (200) is divided to two sections, the present disclosure is not limited thereto, and although the unit stator core has been exemplified, the stator core conventionally forms a ring-shaped structure by coupling a plurality of unit stator cores.

The insulation member (200) may be such that a pair of mechanisms provided at an inside with a space (S) accommodating the tooth (112) is arranged in a plate shape each mechanism facing the mechanism, and a connection part (222) connecting an upper surface of the pair of mechanisms is provided.

Hereinafter, a portion formed by the pair of mechanism with a winding guide groove (221) wound with a coil is defined as a "body part (220)", and a portion extended to a lateral surface from the body part (220) is defined as an "edge part (210)". In addition, a distal end of the body part (220) may be formed with a coupling part (223) provided by being process in thickness thinner than that of the mechanism. The coupling part (223) may be realized at a distal end of the body part at a lower surface of the insulation member in the same structure, as illustrated in the drawing. Thereafter, the coupling parts (223) formed at distal ends of an upper surface and a lower surface of the insulation member may be coupled by being overlapped.

In particular, a protrusion pattern part (230) may be provided on a surfaced of the edge part (210) to fix a coil when the coil is wound later according to the exemplary embodiment of the present disclosure.

The protrusion pattern part (230) may be realized with a 3D (dimensional) structure in an embossed protruding shape, and may be arranged in one or in a plurality of numbers on the surface of the edge part (210) to fix the coil.

Figure 3:
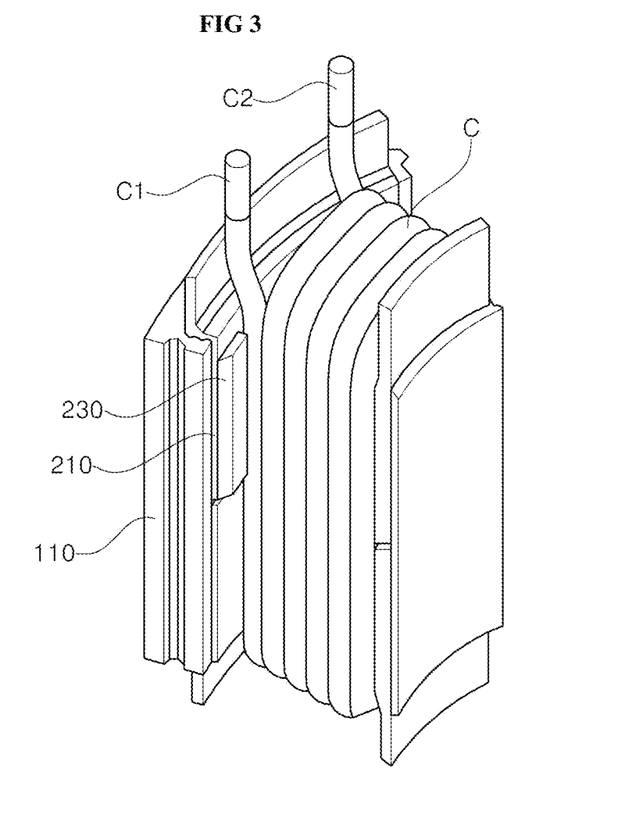
FIG. 3 is a schematic view illustrating an insulation member being coupled to a unit stator core and the insulation member being wound with a coil according to an exemplary embodiment of the present disclosure.
Figure 4:
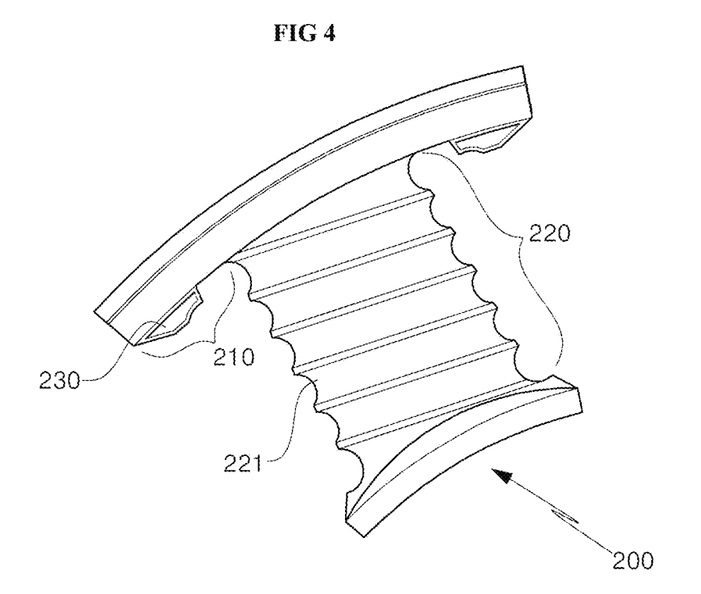
FIG. 4 is a plan view illustrating an insulation member of FIG. 3 seen from above.
Figure 5:
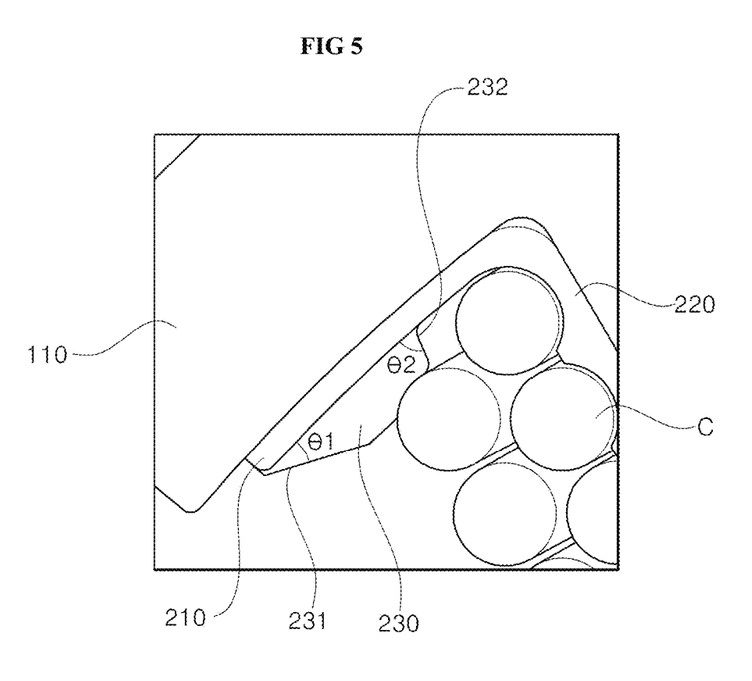
FIG. 5 is an enlarged conceptual view illustrating an arrangement relationship of major elements between protrusion pattern part and a coil.

FIG. 3 is a schematic view illustrating an insulation member being coupled to a unit stator core and the insulation member being wound with a coil according to an exemplary embodiment of the present disclosure, FIG. 4 is a plan view illustrating an insulation member of FIG. 3 seen from above, and FIG. 5 is an enlarged conceptual view illustrating an arrangement relationship of major elements between protrusion pattern part and a coil.

Referring to FIGS. 3, 4 and 5, the protrusion pattern part (230) may be formed on the surface of the edge part (210) in an embossed 3D structure, as explained before. Furthermore, the protrusion pattern part (230) may be provided with a first bank angle ($\theta 1$) on one surface (231) from an outermost marginal area to a body part (220) side. The first bank angle ($\theta 1$) may function to perform as a guidance to allow the coil to easily slide when the coil (C) is wound on the body part, to allow the coil to be tightly attached to the body part, and to allow a winding of coil to be easily wound on the winding guide groove (221). The term "bank angle" as used herein refers to a bevel (e.g., in the surface of protrusion pattern part (230)), as depicted in FIGS. 5-8 (as $\theta$, $\theta 1$, $\theta 2$, $\theta 3$, $\theta 4$, and $\theta 5$).

Overall, the protrusion pattern part (230), as illustrated in FIG. 3, may inhibit a wire from being omitted or from being deviated after the coil (C) is wound by fixing the coils (C1, C2) protruding to the outermost area at an outer area. Furthermore, an opposite area where the first bank angle ($\theta 1$) is formed may be further provided with a second bank angle ($\theta 2$), where the second bank angle ($\theta 2$) may inhibit the coil from being spread to outside by tightly holding the coil. In this case, the first bank angle ($\theta 1$) may be preferably formed with an acute angle to guide the smooth winding of the coil, and the second bank angle ($\theta 2$) may be formed at an angle greater than the first bank angle ($\theta 1$).

In addition, the protrusion pattern part (230) is not limited to a dot shape according to an exemplary embodiment of the present disclosure, and the protrusion pattern part (230) may be arranged by being extended along a lengthwise direction of the insulation member. In this case, the outermost coil may be fixed across the board to a lengthwise direction after finish of winding to enable a further increase in fixing power.

Figure 6:
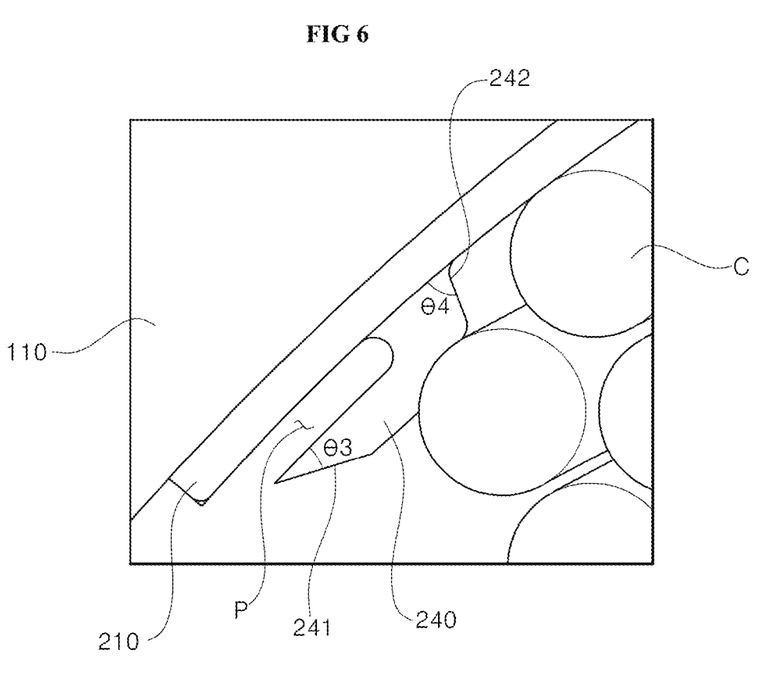
FIGS. 6 and 7 are schematic views illustrating a protrusion pattern part according to another exemplary embodiment of the present disclosure.
Figure 7:
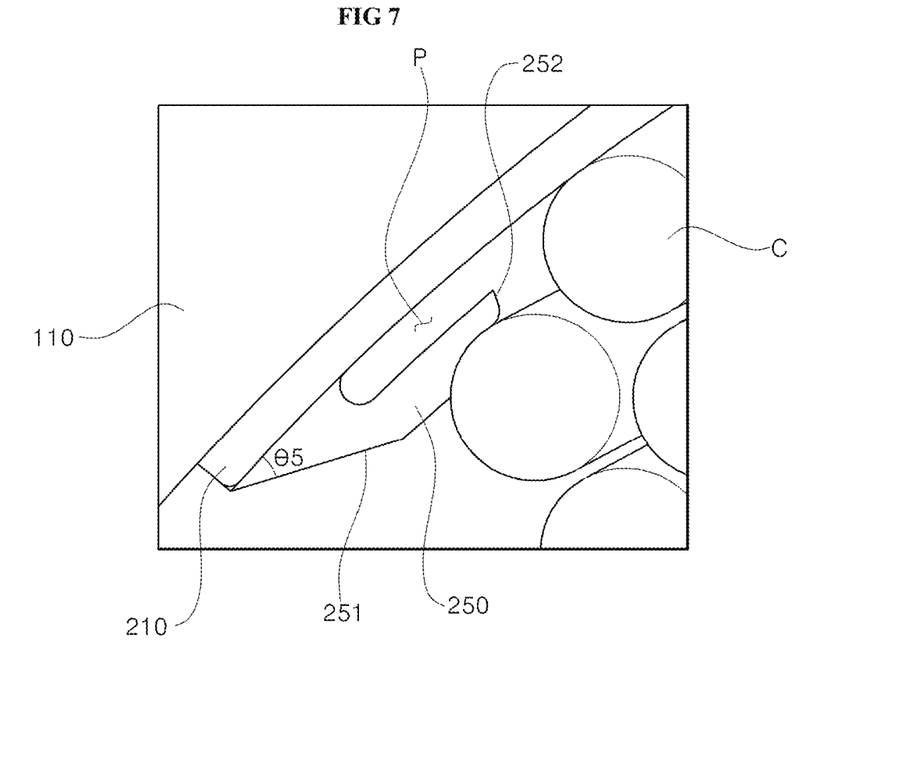

FIGS. 6 and 7 are schematic views illustrating a protrusion pattern part according to another exemplary embodiment of the present disclosure.

Referring to FIGS. 6 and 7, in furtherance to forming a protrusion pattern part (240) in a 3D structure, the structure may be formed in such a fashion that one distal end is fixed to a surface of the edge part, and the other distal end is discrete from the surface of the edge part. This discrete structure enables a discrete part to have a predetermined elasticity and to doubly increase the fixing power of the coil, and overall, motion of magnet wire can be inhibited. The protrusion pattern part (240) may be injection molded with a same material as that of the insulation member (210), or may be realized by attachment of a separate structure.

To be more specific, as illustrated in FIG. 6, the protrusion pattern part (240) may be fixed, at one distal end nearer to the body part, to a surface of the edge part (210) while the other distal end (241) may be formed with a second bank angle ($\theta 3$) toward a body part side. The third bank angle ($\theta 3$) may be formed by an acute angle and may further easiness of winding, which has been already set out as above.

Furthermore, an opposite side (242) of the third bank angle ($\theta 3$) may be formed with a fourth bank angle ($\theta 4$) to strengthen the fixibility.

FIG. 7 is an exemplary embodiment realized in inverse manner from that of FIG. 6, where a protrusion pattern part (250) may be realized, and the other distal end distant from the body part may be fixed to a surface of the edge part (210), and the other distal end may be formed with a fifth bank angle ($\theta 5$) toward a body part side at an acute angle. In this structure, in the aspect of improving usage of elasticity similar to the structure in FIG. 6, fixibility can be more enhanced by way of possible application of a more direct pressure to a coil than that of FIG. 6.

Furthermore, as elaborated in the previous exemplary embodiment, a sixth bank angle ($\theta 6$) may be also formed at the other distal end (252) of the protrusion pattern part (250), and therefore, the shape and effect of which will be omitted in further explanation thereto.

Figure 8:
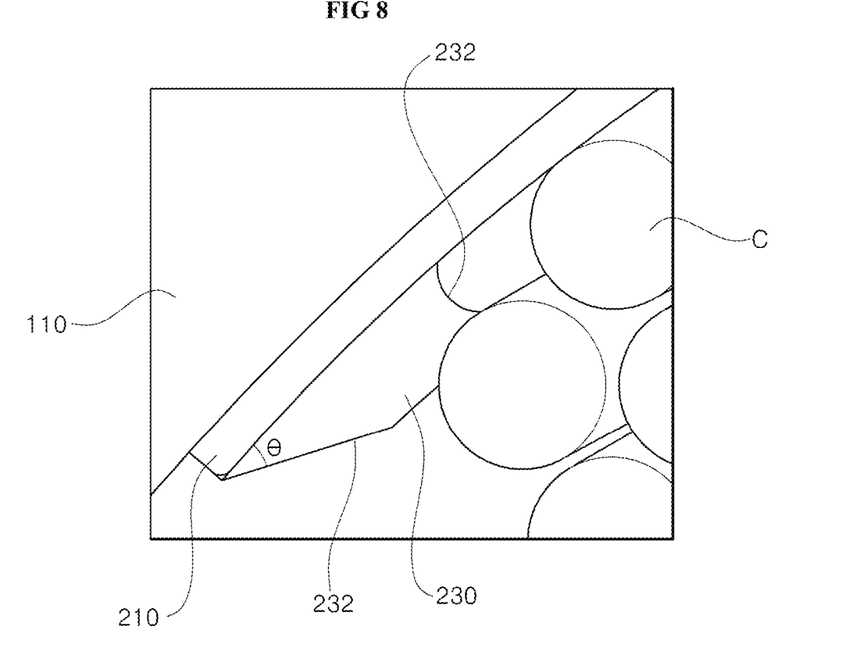
FIG. 8 is a schematic view illustrating a protrusion pattern part according to still another exemplary embodiment of the present disclosure.

FIG. 8 is a schematic view illustrating a protrusion pattern part according to still another exemplary embodiment of the present disclosure.

The characteristic of FIG. 8 in terms of structure is that, although FIG. 8 may be similar to FIG. 5 in that FIG. 8 is also formed with a 3D structure with a bank angle, an opposite side where a seventh bank angle ($\theta 7$) is formed may be further realized with a fixation groove pattern (232) concaved to a center side of the 3D structure.

In this case where the fixation groove pattern (232) is further formed, it should be apparent that fixibility can be further enhanced by a distal end of an outermost coil being inserted into the fixation groove pattern (232) in the structure of FIG. 3. It should be apparent that this structure may be changed to allow the fixation groove pattern (232) to be realized even in the exemplary embodiment of FIG. 6.

Figure 9:
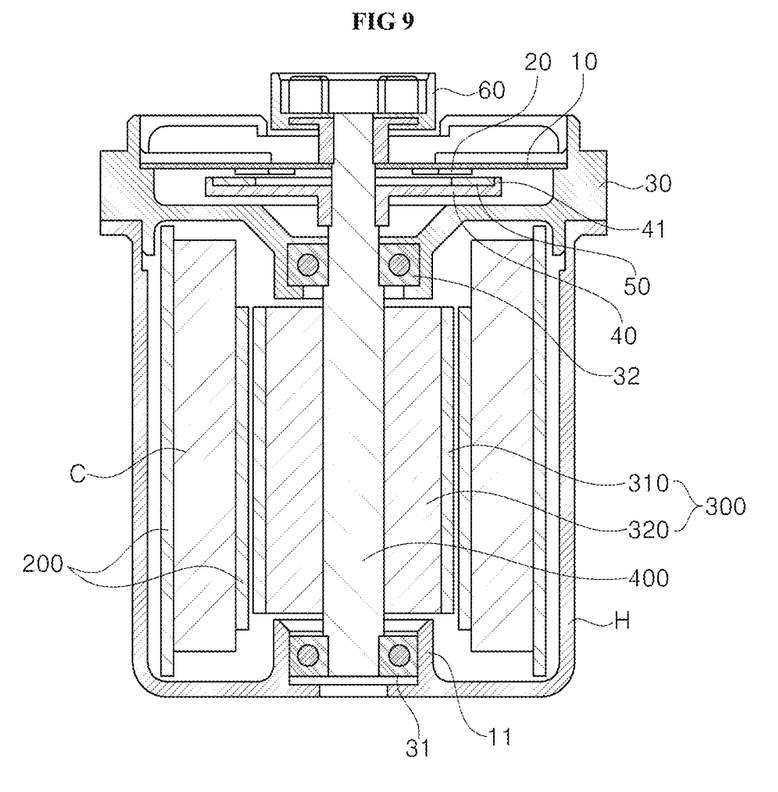
FIG. 9 is a schematic conceptual view illustrating a structure of an EPS motor with a unit stator core according to an exemplary embodiment of the present disclosure.

Hereinafter, an exemplary embodiment of an EPS motor with a unit stator core according to an exemplary embodiment of the present disclosure will be described with reference to FIG. 9. FIG. 9 is a schematic conceptual view illustrating a structure of an EPS motor with a unit stator core according to an exemplary embodiment of the present disclosure.

However, it should be apparent that the stator core according to the exemplary embodiment may be applied to other various motors. An EPS motor will be exemplified and explained in the present exemplary embodiment.

Referring to FIG. 9, a motor housing (H) and a bracket (30) coupled with the motor housing (H) may be provided. The housing (H) may be opened at an upper surface, and may be protrusively formed at a center with a support pipe (11). Furthermore, the bracket (30) may be coupled to an upper surface of the housing (H) to form an inner space. The support pipe (11) may be mounted with a first bearing (31), and the bracket (30) may be mounted with a second bearing (32). The first and second bearings (31, 32) may be supportively contacted by a rotation shaft (400), and the rotation shaft (400) may be supported at an upper surface by the second bearing (32), and may be supported at a lower surface by the first bearing (31).

An upper end part of the rotation shaft (400) may be protruded to an upper side through the bracket (30), and the rotation shaft (400) may be coupled to a mechanism (60) connected to a steering shaft (not shown). The housing (H) may be mounted therein with a stator and a rotor. The rotor may include a rotor core (320) coupled to the rotation shaft (400) and a magnet (310) coupled to a periphery of the rotor core (320). Although the exemplary embodiment has explained and illustrated a structure in which a magnet is coupled to a periphery of a rotor core, unlike this structure, the exemplary embodiment may be realized by a structure in which a magnet is inserted into a rotor core. Furthermore, the stator may include a stator core (200) arranged between a magnet (310) and a housing (110), and a coil (C) wound on a stator core (200).

The stator core and an insulated structure forming the stator may be applied with the structure of the exemplary embodiment explained in FIGS. 1 to 4.

In the above structure, the magnetic field generated from the stator and an electric field generated from the motor may be interacted to each other to rotate the rotation shaft (400).

Meantime, the rotation shaft (400) may rotate along with a sensing plate (190) by being coupled to the rotation shaft (400), and the sensing plate (190) may be mounted with a sensing magnet (50). The bracket (30) may be mounted with a circuit board (10), the circuit board (10) may be mounted with a sensing element (20) opposite to the sensing magnet (50). The sensing element (20) may detect a degree of the sensing magnet (50) being rotated to allow the sensing magnet (50) to detect a degree of the sensing plate (190) coupled by the sensing magnet (50) and the rotation shaft (400) being rotated.

Thus, generation of detachment of magnet wire by vibrations generated from the above rotations can be mitigated by the insulation member provided with a protrusion pattern part according to the exemplary embodiments of the present disclosure, whereby the motor itself can be enhanced in its reliability.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A motor, the motor comprising:
a housing;

a stator disposed in the housing;
a rotor disposed in the stator; and
a shaft disposed in the rotor,
wherein the stator includes a stator core, an insulator coupled to the stator core, and a coil wound on the insulator,
wherein the insulator includes a body part on which the coil is wound, an edge part extending from the body part, and a protrusion part protruding from the edge part,
wherein the protrusion part is disposed closer to a top or bottom of the body part than to a center of the body part on an axial direction of the shaft, and
wherein the protrusion part is disposed closer to one end of the edge part than to the body part.

2. The motor of claim 1, wherein the insulator includes a first insulator coupled to one side of the stator core and a second insulator coupled to an other side of the stator core, and
wherein the protrusion part is disposed adjacent to an upper end of the first insulator or adjacent to a lower end of the second insulator.

3. The motor of claim 1, wherein the protrusion part protrudes in the shaft direction from an inner circumferential surface of the edge part.

4. The motor of claim 2, wherein the protrusion part is disposed on at least one side of the first insulator and the second insulator.

5. The motor of claim 2, wherein the protrusion part is disposed closer to one side than to an other side of the body part of the first insulator.

6. The motor of claim 2, wherein the first insulator is coupled in one direction of the stator core, and
wherein the second insulator is coupled in an other direction of the stator core.

7. The motor of claim 2, wherein a length of the protrusion part relative to the axial direction of the shaft is smaller than a length of the first insulator.

8. The motor of claim 1, wherein the protrusion part includes a first surface extending from an outermost edge part of the protrusion part in the direction of the body part and a second surface disposed opposite to the first surface, and has first and second inclination angles,
wherein the first inclination angle is smaller than the second inclination angle.

9. The motor of claim 8, wherein the protrusion part includes a surface parallel to the third surface.

10. The motor of claim 1, wherein the protrusion part includes a second surface extending from an inner surface of the edge part and a first surface extending from the second surface,
wherein the protrusion part includes an imaginary third surface parallel to the inner surface of the edge part and a first inclination angle formed by the first surface, and a second inclination angle formed by the second surface and the third surface, and
wherein the first inclination angle is smaller than the second inclination angle.

11. The motor of claim 1, wherein the protrusion part is disposed adjacent one end of the edge part, and a length of the protrusion part is less than half of a length of the body part relative to the axial direction of the shaft.

12. The motor of claim 1, wherein one surface of the protrusion part includes a curved shape and the curved shape is in contact with the coil.

13. The motor of claim 1, wherein the stator core includes a head part and a tooth part extending from the head part, and
wherein at least a portion of the protrusion part is disposed outside an end of the head part with respect to the body part.

14. A motor, the motor comprising:
a housing;
a stator disposed in the housing;
a rotor disposed in the stator; and
a shaft disposed in the rotor,
wherein the stator includes a stator core, an insulator coupled to the stator core, and a coil wound on the insulator,
wherein the insulator includes a body part on which the coil is wound, an edge part extending from the body part, and a protrusion part protruding from the edge part,
wherein a length of the protrusion part is less than half a length of the insulator in an axial direction of the shaft, and
wherein the coil is disposed between the protrusion part and the body part.

15. The motor of claim 14, wherein one surface of the protrusion part includes a curved shape and the curved shape is in contact with the coil.

16. The motor of claim 14, wherein the stator core includes a head part and a tooth part extending from the head part, and
wherein at least a portion of the protrusion part is disposed outside an end of the head part with respect to the body part.

17. The motor of claim 14, wherein a first side surface forms a first angle with a surface of the edge part,
wherein a second side surface forms a second angle with the surface of the edge part, and
wherein the first angle is greater than the second angle.

18. The motor of claim 14, wherein a first side surface forms a first angle with a surface of the edge part,
wherein a second side surface forms a second angle with the surface of the edge part, and
wherein the first angle is smaller than the second angle.

19. A motor, the motor comprising:
a housing;
a stator disposed in the housing;
a rotor disposed in the stator; and
a shaft disposed in the rotor,
wherein the stator includes a stator core, an insulator coupled to the stator core, and a coil wound on the insulator,
wherein the insulator includes a body part on which the coil is wound, an edge part extending from the body part, and a protrusion part protruding from the edge part, wherein the protrusion part includes a first side surface facing the body part and a second side surface opposite to the first side surface,
wherein the protrusion part is disposed closer to one end of the edge part than to the body part, and
wherein an acute angle formed between the first side surface of the protrusion part and the edge part is larger than an acute angle formed between the second side surface of the protrusion part and the edge part.

* * * * *